United States Patent
Cao et al.

(10) Patent No.: US 11,354,901 B2
(45) Date of Patent: *Jun. 7, 2022

(54) ACTIVITY RECOGNITION METHOD AND SYSTEM

(71) Applicant: TURING VIDEO, San Mateo, CA (US)

(72) Inventors: Song Cao, San Mateo, CA (US); Fang Wang, Redwood City, CA (US)

(73) Assignee: Turing Video, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,199

(22) Filed: Apr. 23, 2020

(65) Prior Publication Data
US 2020/0250435 A1    Aug. 6, 2020

Related U.S. Application Data

(63) Continuation of application No. 15/914,360, filed on Mar. 7, 2018, now Pat. No. 10,691,950.
(Continued)

(51) Int. Cl.
*G06V 20/40* (2022.01)
*G08B 21/22* (2006.01)
(Continued)

(52) U.S. Cl.
CPC ............ *G06V 20/41* (2022.01); *G06K 9/6281* (2013.01); *G06K 9/6282* (2013.01); *G06T 7/74* (2017.01); *G06V 10/454* (2022.01); *G06V 20/47* (2022.01); *G06V 20/52* (2022.01); *G06V 40/103* (2022.01); *G06V 40/107* (2022.01); *G06V 40/20* (2022.01);
(Continued)

(58) Field of Classification Search
CPC combination set(s) only.
See application file for complete search history.

(56) References Cited

U.S. PATENT DOCUMENTS 5,666,157 A    9/1997  Aviv
6,028,626 A    2/2000  Aviv
(Continued)

OTHER PUBLICATIONS

Ibrahim et al., "Hierarchical Deep Temporal Models for Group Activity Recognition", Jul. 2016, arXiv, https://arxiv.org/pdf/1607.02643.pdf (Year: 2016).*
(Continued)

*Primary Examiner* — Zhiyu Lu
(74) *Attorney, Agent, or Firm* — Sheppard Mullin Richter & Hampton LLP (57) ABSTRACT

An activity recognition system may comprise a local device and a server. The local device may be configured to: obtain a video; determine whether at least one human is present in one or more frames of the video; in response to determining the at least one human present in the video, determine if the at least one human in each of the frames corresponds to the same person; in response to determining that the at least one human in each of the frames corresponds to the same person, determine if the person is a stranger; and in response to determining that the person is not a stranger, transmit at least a portion of the video to the server. The server may be configured to: predict an activity class associated with the person; and trigger an alarm based on the activity class.

17 Claims, 5 Drawing Sheets

Related U.S. Application Data (60) Provisional application No. 62/469,534, filed on Mar. 10, 2017.

(51) Int. Cl.

| | | |
|---|---|---|
| *G06T 7/73* | (2017.01) |
| *G06K 9/62* | (2022.01) |
| *G08B 13/196* | (2006.01) |
| *G06V 10/44* | (2022.01) |
| *G06V 20/52* | (2022.01) |
| *G06V 40/20* | (2022.01) |
| *G06V 40/10* | (2022.01) |
| *H04N 5/232* | (2006.01) |
| *H04N 21/2743* | (2011.01) |
| *H04N 21/442* | (2011.01) |
| *H04N 21/4223* | (2011.01) |
| *H04N 21/234* | (2011.01) |

(52) U.S. Cl.
CPC ....... *G08B 13/19613* (2013.01); *G08B 21/22* (2013.01); *G06V 20/44* (2022.01); *H04N 5/23229* (2013.01); *H04N 21/23418* (2013.01); *H04N 21/2743* (2013.01); *H04N 21/4223* (2013.01); *H04N 21/44218* (2013.01)

(56) References Cited

U.S. PATENT DOCUMENTS

| | | | | |
|---|---|---|---|---|
| 6,996,171 | B1* | 2/2006 | Walker ................ | G11B 27/28 375/240.09 |
| 8,004,563 | B2 | 8/2011 | Talmon et al. | |
| 9,564,031 | B2 | 2/2017 | Migdal et al. | |
| 2004/0161133 | A1* | 8/2004 | Elazar ................ | G06K 9/00771 382/115 |
| 2004/0240542 | A1* | 12/2004 | Yeredor ............ | G06K 9/00771 375/240.01 |
| 2009/0181640 | A1 | 7/2009 | Jones | |
| 2010/0079675 | A1 | 4/2010 | Oya | |
| 2010/0106573 | A1 | 4/2010 | Gallagher et al. | |
| 2011/0007975 | A1* | 1/2011 | Kazama ............ | G06K 9/00234 382/225 |
| 2012/0150586 | A1* | 6/2012 | Harper ............... | G06Q 30/0204 705/7.33 |
| 2014/0079297 | A1 | 3/2014 | Tadayon et al. | |
| 2014/0201126 | A1 | 7/2014 | Zadeh et al. | |
| 2014/0279516 | A1 | 9/2014 | Rellas et al. | |
| 2014/0328570 | A1* | 11/2014 | Cheng ............. | H04N 21/44008 386/241 |
| 2015/0248754 | A1* | 9/2015 | Graner ............. | G06K 9/00771 382/103 |
| 2015/0278585 | A1 | 10/2015 | Laksono et al. | |
| 2015/0279155 | A1* | 10/2015 | Chun ................ | G07F 17/3234 463/25 |
| 2016/0049071 | A1 | 2/2016 | Beaver et al. | |
| 2016/0163029 | A1* | 6/2016 | Gibbon ............. | G06K 9/00288 382/190 |
| 2016/0278667 | A1 | 9/2016 | Villard et al. | |
| 2016/0335865 | A1 | 11/2016 | Sayavong et al. | |
| 2016/0364927 | A1 | 12/2016 | Barry et al. | |
| 2017/0013230 | A1* | 1/2017 | Hirakawa ............. | H04N 7/183 |
| 2017/0078767 | A1* | 3/2017 | Borel ................ | G06K 9/00758 |
| 2017/0092109 | A1* | 3/2017 | Trundle ................ | B60L 53/305 |
| 2017/0213091 | A1* | 7/2017 | Cao ..................... | G06K 9/2081 |
| 2018/0232904 | A1* | 8/2018 | Zakharevich ....... | G06K 9/00268 |

OTHER PUBLICATIONS

Le et al., "Learning hierarchical invariant spatio-temporal features for action recognition with independent subspace analysis", Aug. 2011, IEEE, https://ieeexplore.IEEE.org/stamp/stamp.jsp?tp=&arnumber=5995496 (Year: 2011).*

Nie et al., "Joint Action Recognition and Pose Estimation From Video", 2015, CVF, https://openaccess.thecvf.com/content_cvpr_2015/papers/Nie_Joint_Action_Recognition_2015_CVPR_paper.pdf (Year: 2015).*

Wang et al., "An approach to pose-based action recognition", 2013, CVF, https://openaccess.thecvf.com/content_cvpr_2013/papers/Wang_An_Approach_to_2013_CVPR_paper.pdf (Year: 2013).*

Hussein et al., "Human Action Recognition Using a Temporal Hierarchy of Covariance Descriptors on 3D Joint Locations", 2013, https://www.ijcai.org/Proceedings/13/Papers/363.pdf (Year: 2013).*

Notice of Allowance dated Feb. 18, 2020, issued in related U.S. Appl. No. 15/914,360 (11 pages).

* cited by examiner

ACTIVITY RECOGNITION METHOD AND SYSTEM

CROSS REFERENCE TO RELATED APPLICATION

This application is a continuation application of U.S. Non-Provisional application Ser. No. 15/914,360, filed on Mar. 7, 2018, which claims the benefit of and priority to U.S. Provisional Application No. 62/469,534, filed on Mar. 10, 2017, and entitled "ACTIVITY RECOGNITION METHOD AND SYSTEM BASED ON LOCAL AND CLOUD COMPUTATION." The above-referenced application are incorporated by reference in their entirety.

TECHNICAL FIELD

The present disclosure relates to activity recognition methods and systems, and in particular, to methods and systems for recognizing human activities in videos.

BACKGROUND

Activity recognition has been a challenging topic in computer vision. The range of activities to be recognized may vary broadly in terms of their specific usage such as in video search, video surveillance, and human-robot interaction. Among others, computer vision technology for real-time video surveillance has achieved fast development in recent years. Traditionally, recognition algorithms are executed in local devices. However, as algorithms become more and more complex and "Cloud" computation becomes widely adopted nowadays, many complex recognition algorithms are executed in a "Cloud" server.

Complex recognition algorithm executed in a Cloud server may recognize more human activities, which improves recognition accuracy. However, Cloud computation may involve problems concerning network flow and delay, which is difficult to solve, especially when high-definition cameras become prevalent and the data volume uploaded to the Cloud servers increases significantly. Traditional hardware companies, such as those manufacturing cameras and surveillance devices, and traditional algorithm providers do not have access to each other's resources, and therefore fail to streamline activity recognition.

SUMMARY

According to one aspect, an activity recognition system may comprise a local device and a server. The local device may be configured to: obtain a video; determine whether at least one human is present in one or more frames of the video; in response to determining the at least one human present in the video, determine if the at least one human in each of the frames corresponds to the same person; in response to determining that the at least one human in each of the frames corresponds to the same person, determine if the person is a stranger; and in response to determining that the person is not a stranger, transmit at least a portion of the video to the server. The server may be configured to: predict an activity class associated with the person; and trigger an alarm based on the activity class.

According to another aspect, an activity recognition method may comprise: obtaining a video; determining whether at least one human is present in one or more frames of the video; in response to determining the at least one human present in the video, determining if the at least one human in each of the frames corresponds to the same person; in response to determining that the at least one human in each of the frames corresponds to the same person, determining if the person is a stranger; in response to determining that the person is not a stranger, transmitting at least a portion of the video to the server; predicting an activity class associated with the person; and triggering an alarm based on the activity class.

According to another aspect, a non-transitory computer-readable storage medium storing instructions that, when executed by one or more processors, cause the one or more processor to perform an activity recognition method is disclosed. The method may comprise: (1) obtaining a video; (2) determining whether at least one human is present in one or more frames of the video; (3) in response to determining the at least one human present in the video, determining if the at least one human in each of the frames corresponds to the same person; (4) in response to determining that the at least one human in each of the frames corresponds to the same person, determining if the person is a stranger; (5) in response to determining that the person is not a stranger, transmitting at least a portion of the video to the server; (6) predicting an activity class associated with the person; and (7) triggering an alarm based on the activity class.

In some embodiments, the one or more processors comprise at least a first processor associated with a local device (e.g., a processor of a local device), and at least a second processor associated with a server (e.g., a processor of a server). The instructions may cause the local and/or the server to perform various steps of the activity recognition method. For example, the first processor is caused to perform (1)-(5), the second processor is caused to perform (6)-(7), and performing (6) requires more computing power and more costs than performing (1)-(5).

It is to be understood that the descriptions herein are merely exemplary and do not limit the scope of the disclosure.

DETAILED DESCRIPTION

Figure 1:
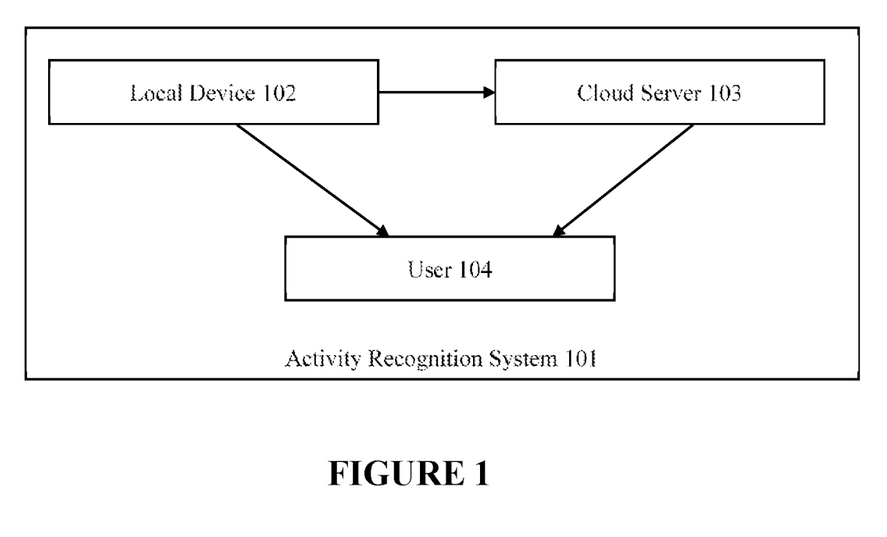
FIG. 1 illustrates an exemplary activity recognition system according to some embodiments of the present disclosure.

FIG. 1 illustrates an exemplary activity recognition system 101 according to some embodiments of the present disclosure. As shown in FIG. 1, the activity recognition system 101 comprises a local device 102 (e.g., for local data processing) and a Cloud server 103 (e.g., for cloud processing). The activity recognition system 101 may optionally comprise a user 104. The local device 102 and the Cloud server 103 may be communicative with each other and other devices via Wifi, cable, or an alternative communication channel. For example, the local device 102 may transmit a video portion to the Cloud server 103 for processing. Computation results from the local device 102 and/or the Cloud server 103 may be output to the user 104 in various forms.

Figure 2:
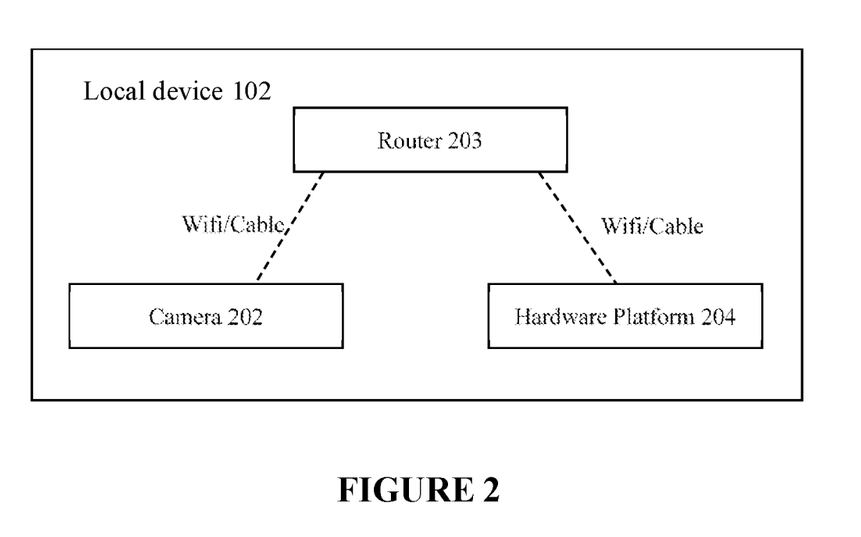
FIG. 2 illustrates an exemplary local device according to some embodiments of the present disclosure.

FIG. 2 illustrates an exemplary local device 102 according to some embodiments of the present disclosure. The local device can be implemented as a computer, a smart phone, etc. As shown in FIG. 2, the local device 102 may include one or more camera(s) 202 (or other alternative image sensors), a router 203, and a hardware platform 204. The camera(s) 202 may be configured to capture video data, which may include for example human activities. The hardware platform 204 may be configured to analyze the video captured by the camera(s) 202 and may be embedded with certain basic processing functions, such as data importing, data enhancing, and simple activity recognizing. The hardware platform 204 may be implemented as a software, a hardware, or a combination of both. The camera(s) 202 and the hardware platform 204 are connected to the router 203 via Wifi, cable, or an alternative communication channel.

In one example, a Raspberry Pi™ system may be used as the hardware platform 204. The Raspberry Pi system may comprise a series of small single-board computers that can be programmed to perform certain functions. The processor at the heart of the Raspberry Pi™ system is a system-on-chip (SoC) multimedia processor. Thus, the vast majority of the system's components, including its central processing unit(s) and graphics processing unit(s) along with the audio and communications hardware, are built at the center of the board. The Raspberry Pi system uses an instruction set architecture (ISA), known as ARM, which has a simple reduced instruction set (RISC) architecture and low power draw. Moreover, the Raspberry Pi is designed to run an open source operating system called GNU/Linux.

In another example, NVIDIA Jetson TX1™ may be used as the hardware platform. NVIDIA Jetson is an artificial intelligence (AI) computing platform for GPU-accelerated parallel processing in the mobile embedded systems market, and Jetson TX1 is a supercomputer on a module of a credit card size. Jetson TX1 features the new NVIDIA Maxwell™ architecture, 256 NVIDIA CUDA® cores, and 64-bit CPUs. CUDA® is a parallel computing platform and programming model, which enables increases in computing performance by harnessing the power of the GPU. Maxwell™ architecture is an architecture for CUDA compute applications, which brings improvements to control logic partitioning, workload balancing, clock-gating granularity, compiler-based scheduling, number of instructions issued per clock cycle and other enhancements that improves energy efficiency. Moreover, Jetson TX1 includes the latest technology for deep learning, computer vision, GPU computing, and graphics.

Alternatively, other embedded systems may be used as the hardware platform, which is not limited herein.

Figure 3:
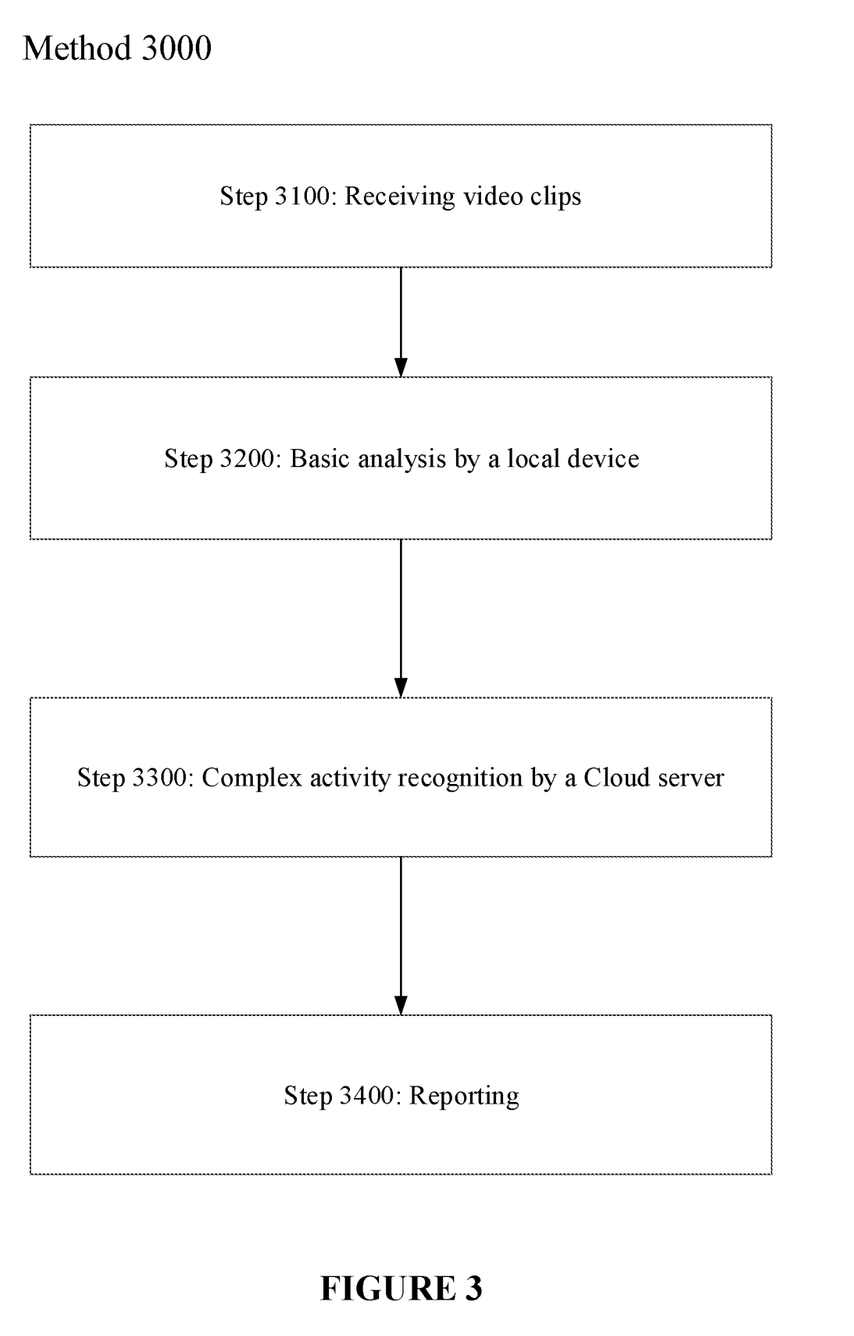
FIG. 3 illustrates an exemplary activity recognition method according to some embodiments of the present disclosure.

FIG. 3 illustrates an exemplary activity recognition method 3000 according to some embodiments of the present disclosure. The method 3000 may be performed by one or more components or subcomponents of the activity recognition system 101. As shown in FIG. 3, the method 3000 may include steps 3100-3400. It will be readily appreciated that the illustrated procedure can be altered to include less or more steps.

At Step 3100, video clips may be received. In some embodiments, the video stream of all the cameras 202 will be imported into the hardware platform 204 of the local device 102. During this process, the video clips may be compressed and the frame rate may be corrected according to needs.

At Step 3200, basic analysis may be performed. In some embodiments, the local device 102 may conduct a basic analysis on the received video clips. For example, the hardware platform 204 of the local device 102 may comprise a processor and a non-transitory computer-readable storage medium storing instructions that, when executed by the processor, cause the processor to perform the basic analysis. In one example, the basic analysis may include coarse level human detection, which may be realized in local devices at lower computational costs and produce relatively accurate result. Based on the detection result of this step, the local device 102 may determine whether the video clip needs further analysis (e.g., when the detection result has not achieved a threshold accuracy). In response to determining that the video clip needs further analysis, the local device 102 may upload at least a portion of the video clip that needs further analysis to the Cloud server 103.

At Step 3300, complex analysis may be performed. In some embodiments, the Cloud server 103 may conduct a complex analysis on the portion of the video clip received from the local device 102. For example, the complex analysis may include fine grained activity recognition to produce accurate analysis result.

At Step 3400, a response may be triggered based on the complex analysis. The response may comprise various forms. In one example, as the response, the computation result of the video clips captured by one or more cameras are reported to the users, such as administrators, security personnel, etc. In another example, the activity recognition system 101 may directly inform the police when a stranger has been identified from the analysis.

In some embodiments, the activity recognition system focuses mainly on human activity recognition. Various algorithms that can be used for activity recognition are listed and compared in Table 1 below.

| Algorithm | Semantics | Complexity | Effectiveness |
| --- | --- | --- | --- |
| Background Subtraction (Video) | X | Low | Low |
| Pixel Detection (Video) | None | Low | Low |
| Human Detection (Image) | Yes | Low | High |
| Object Detection (Image) | Yes | High | Low |
| Stranger Detection (Image) | Yes | Low | High |
| Activity Recognition (Short Video) | Yes | High | High (if human is detected) |
| Pose Recognition | None | High | High (if human is detected) |

As shown in Table 1, each algorithm has its distinctive features. Traditional background subtraction and pixel detection algorithms, though easy to implement, do not obtain semantic information, and therefore cannot be used to for activity detection. Thus, these two traditional algorithms are rather limited in practice.

To overcome the deficiencies in traditional algorithms, human detection algorithm and stranger detection algorithm can be implemented in local devices with lower computational costs and produce relatively accurate result. More details of the human detection algorithm are provided below.

Figure 4:
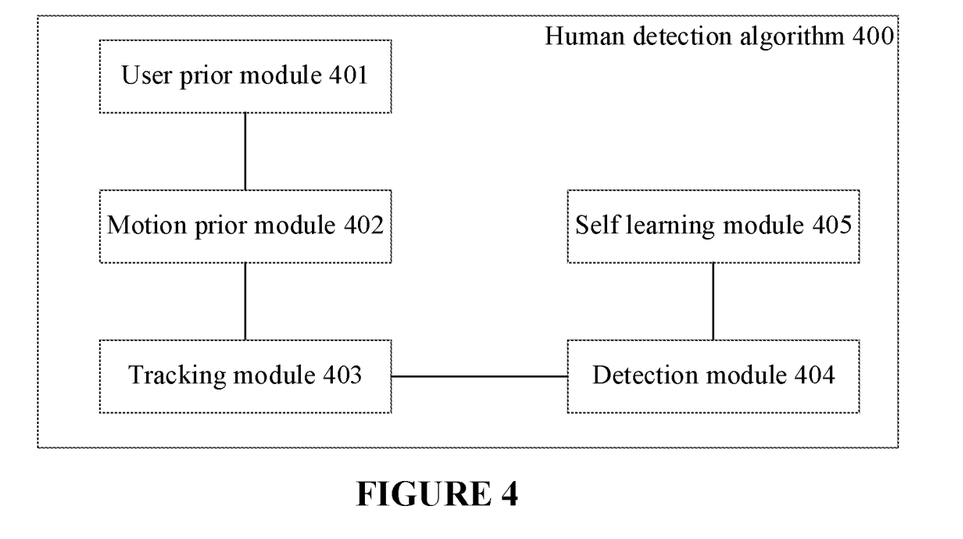
FIG. 4 illustrates an exemplary human detection algorithm according to some embodiments of the present disclosure.

FIG. 4 illustrates an exemplary human detection algorithm 400 according to some embodiments of the present disclosure. As shown in FIG. 4, the algorithm may comprise one or more software modules, including a User Prior Module 401, a Motion Prior Module 402, a Tracking Module 403, a Detection Module 404, and a Self-Learning Module 405. The various module can be software modules implemented as instructions stored in a memory. For example, a non-transitory computer-readable storage medium may store instructions that, when executed by a processor, cause the processor to perform various steps and methods described herein with respect to the modules. In some embodiments, a workflow of the human detection algorithm 400 may be characterized by three phases: a pre-processing phase including user pre-definition and motion detection, a core phase including tracking, and a post-processing phase including self-learning. The post-processing phase may be use-specific.

In some embodiments, during the implementation of the User Prior Module 401, a user may click two times to select a window of a video (e.g., one click at top left, and the other click at bottom right) or otherwise select a frame from the video. Then, the current image can be obtained as a user pre-defined foreground.

In some embodiments, during the implementation of the Motion Prior Module 402, a background model can be built using a Gaussian Mixture Model (GMM). The input of the background model can comprise a frame, the output can comprise a motion probability and a motion mask.

In one example, after the background model is initialized as M, for each input frame f, a difference between f and the background model M can be obtained. When the input is a RGB color image, three Gaussians $g_1$, $g_2$, $g_3$ can be used to describe these three channels. Since each Gaussian will output a probability, the probability of a combined Gaussian as $p(i,j)=g_1+g_2+g_3$ can describe a region or pixel(i,j) in the foreground or background. Each Gaussian can be described as $g(I, \mu, \sigma)$. The whole background model can be an online updating model. Accordingly, the model can keep updating the background parameter to reflect changes of the viewpoint or illumination (e.g., when the camera keeps rotating, when sun rises or sets). After adding in the current frame f, $\mu$ and $\sigma$ can be updated using Expectation-Maximization Algorithm (EM algorithm). Traditional motion detection algorithms only use hard differential threshold. That is, for each region or pixel, $d(i,j)=|f_{current}-f_{previous}|$. By comparison, the disclosed algorithm is more reliable, advanced, and can handle changes of viewpoint and illumination.

In some embodiments, during the implementation of the Tracking Module 403, the input is the detected region of the last five frames, the output is a predicted candidate region ROI. For example, assuming that the detection result for $f_i$ where i=1, . . . , 5 are $r_{ij}=(x, y, w, h)$, and if the detection result $r_{ij}$ and $r_{i,j'}$ are similar, a high probability region ROI can be determined (e.g., a ROI can be a frame region that show differences among consecutive frames). The recent detection responses can be stored in a buffer. Object detecting (e.g., implemented by the Detection Module 404 described below) can be applied only in the predicted region, such that the potential detection area is narrowed.

In some embodiments, during the implementation of the Detection Module 404, the input is a frame with ROI, and the output is a detection response. The Detection Module is used to detect a human in the image. In one example, first, the RGB image can be converted into gray image. Then, the APCF (Associated Pairing Comparison Features) features can be extracted from the gray image. The APCF features can give to a chain of weak classifiers. Each classifier can give a determination for the current extracted APCF feature.

In some embodiments, during the implementation of the Self-Learning Module 405, false alarms can be automatically learned in the backend and filtered out. The input of this module can comprise a candidate detection result, and the output can comprise a determining of True (e.g., the detected danger is real) or False (e.g., the detected danger is a false alarm). If true, the result (e.g., the detected danger) can be reported; and if not, the result can be filtered out.

In some embodiments, the Self-Learning Module 405 may be executed to implement the following method. In a dataset, all the false alarms can be collected and converted into SURF (Speeded-up Robust Features) features and stored as false alarm features. For each new test candidate $a_i$, its SURF feature can be computed as $f(a_i)$, and this feature can be computed to match with the false alarm features. If the matched points are over a number T, which indicates the new test candidate much similar to the false alarm samples, and should be counted as a false positive.

Alternatively, other detection algorithms may also be suitable for conducting the basic analysis described above, and is not limited herein.

Activity recognition algorithm and pose recognition algorithm are relatively complex algorithms which depend heavily on pre-defined conditions. For example, the traditional activity recognition algorithm may assume that there is a human in the video. Thus, when receiving a random video clip, the traditional activity recognition algorithm may output a false response. Moreover, the traditional position recognition algorithm may have the same problem, where the joints of the human body can be located effectively only under the presumption that the bounding box of a human has been detected. However, when receiving an image without any human, the traditional position recognition algorithm may output a false response.

Figure 5:
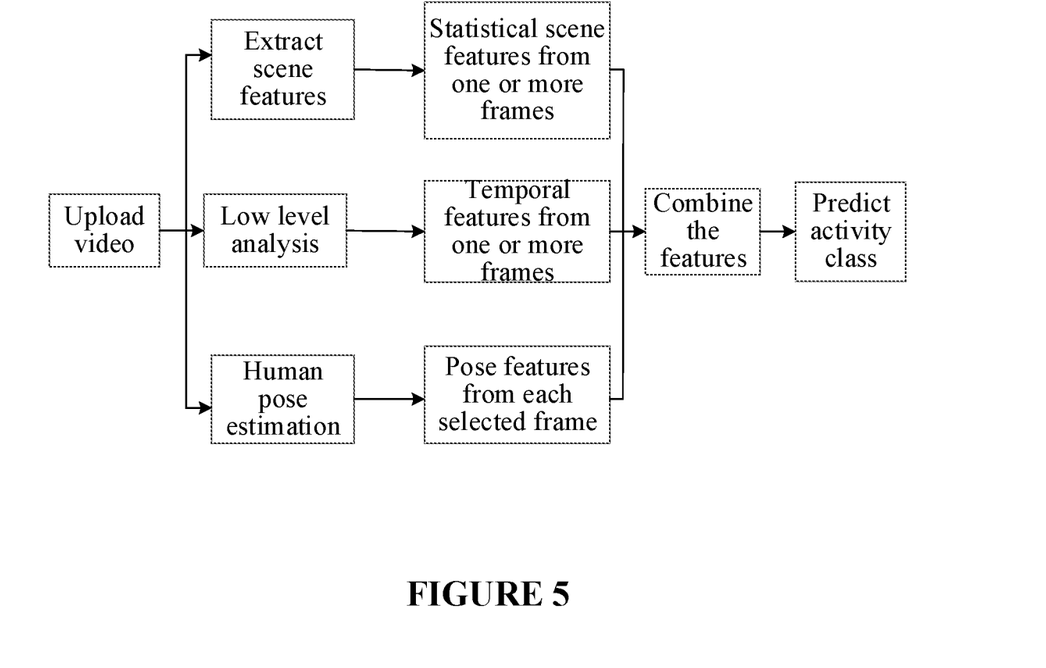
FIG. 5 illustrates an exemplary activity recognition method according to some embodiments of the present disclosure.

FIG. 5 illustrates an exemplary activity recognition method according to some embodiments of the present disclosure. The activity recognition method may be referred to as an activity recognition algorithm. The activity recognition method or algorithm comprises various steps. In some embodiments, the disclosed activity recognition algorithm adopts deep learning method and combines three levels of information including scene information, temporal information, and pose information to achieve better activity recognition.

In one example, various analysis including scene feature extraction, low level analysis, and human pose estimation can be performed to an uploaded video. For scene information extraction, statistical scene features can be extracted based on deep learning from one or more frames (e.g., all frames) of the video. A person of ordinary skill in the art would appreciate that the statistical scene features may comprise statistical features of scenes, which for example may derive from statistical classification by machine learning. For the low level analysis, temporal features can be obtained from one or more frames (e.g., key frames) of the video. A person of ordinary skill in the art would appreciate that the temporal features may comprise feature information with respect to time. For the human pose information, pose features can be extracted from one or more frames (e.g., each selected frame) of the video. A person of ordinary skill in the art would appreciate that the pose features may comprise pose information of a detected person. Then, the deep learning information from these three types of features can be combined for predicting the activity class.

Figure 6:
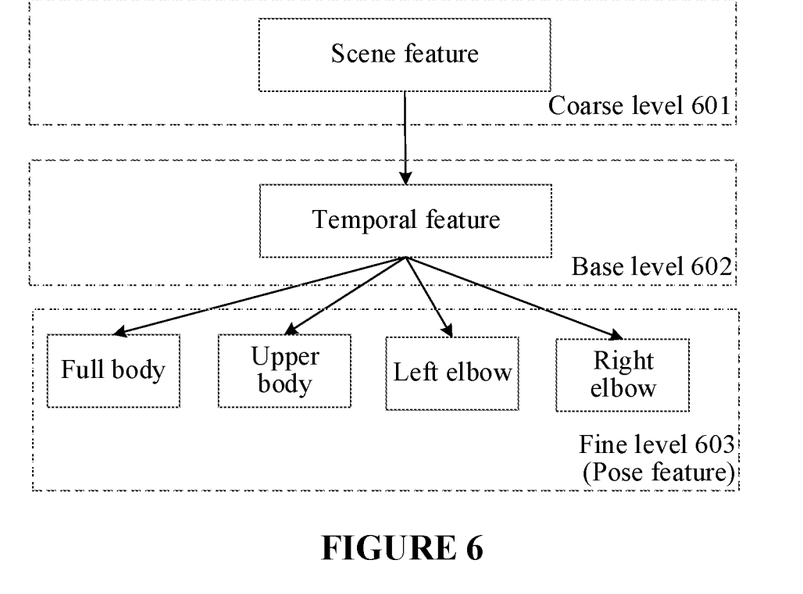
FIG. 6 illustrates a Hierarchy Pose Temporal Model (HPT) used in the activity recognition process in FIG. 5 according to some embodiments of the present disclosure.

In some embodiments, a tree structure model named Hierarchy Pose Temporal Model (HPT) as shown in FIG. 6 is used to implement at least a part of the activity recognition algorithm described above. The HPT model can be a software model implemented as instructions stored in a memory. For example, a non-transitory computer-readable storage medium may store instructions that, when executed by a processor, cause the processor to perform various steps and methods described herein with respect to the HPT model. As shown in FIG. 6, when receiving an input video, the HPT model may extract statistical scene features (e.g., from all frames) at a coarse level 601 for HPT. Then, the HPT model may extract temporal features in a base level 602 and pose features in a fine level 603. As such, the HPT model builds a hierarchical coarse to fine framework to integrate scene information, temporal information, and pose information for fine grained activity recognition. Here, scene information can provide general information and background information in videos, and is thus used as the coarse level feature. Temporal information comprises timing information. To utilize the temporal information, the HPT model selects one or more key frames from each video. Thus, temporal information can be used as the base level feature. Within each key frame, human pose information can be very discriminative, and therefore can be used as the fine level feature.

Figure 7:
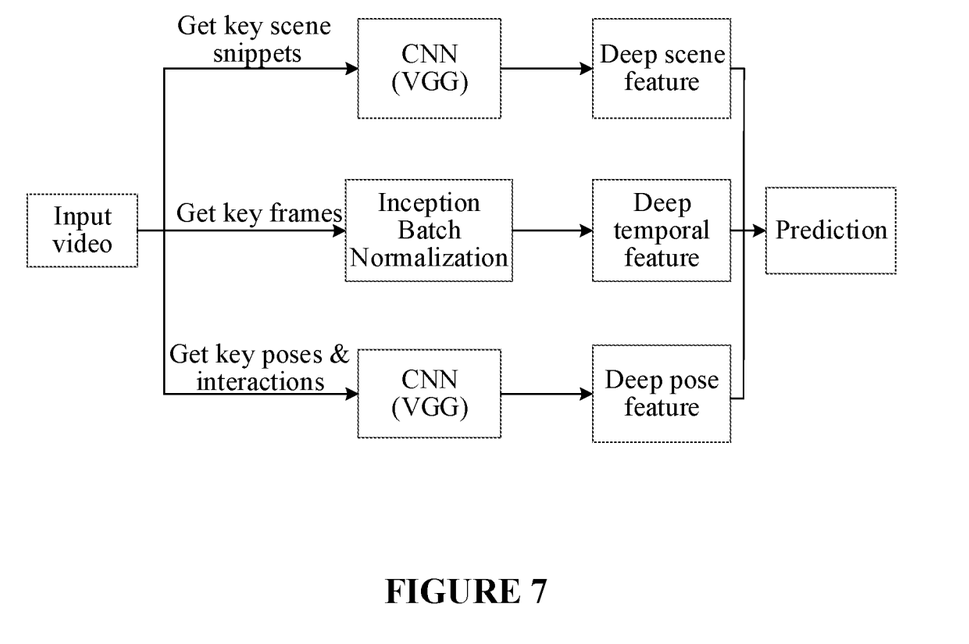
FIG. 7 illustrates an exemplary work flow of Hierarchy Pose Temporal Model (HPT) according to some embodiments of the present disclosure.

FIG. 7 illustrates an exemplary work flow of Hierarchy Pose Temporal Model (HPT) according to some embodiments of the present disclosure. The description below includes HPT representation, HPT inference, and HPT learning.

HPT Representation

HPT representation feature F includes scene feature $F_s$, temporal feature $F_t$, human pose feature $F_p$, and deformable feature $F_d$. Accordingly, $F=[F_s, F_t, F_p, F_d]$, representing a combination of the four major components.

Scene Features $F_s$

As shown in FIG. 7, key scene snippets may be obtained from an input video, and machine learning algorithms (e.g., convolutional neural network (CNN)) may be used to obtain deep scene features from the key scenes. In some embodiments, scene features $F_s$ can be used as HPT's coarse layer. To obtain the statistical scene feature $F_s$, the HPT model may first extract raw scene feature f from each frame. The statistical scene feature $F_s$ can be described using both a static scene feature and a dynamic scene feature as $F_s=[F_s^{sta}, F_s^{dyn}]$. Statistical summary can be used on this coarse level information with min, max, mean, std dimension operation strategy.

In some embodiments, $F_s$ is a summarization of all the video frames, using operations such as mean, std, min and max by computing minimum or mean values for each descriptor dimension i over T video frames. Therefore, the static video descriptor $F_s^{sta}$ for RGB or for flow can be obtained by the concatenation of time-aggregated frame descriptors f where t is the frame number. An example is shown in Equation 1. In the example, $a_i$, $b_i$, $c_i$, $d_i$ represents dimension i's output for mean, std, min, max feature operator correspondingly.

$$F_s^{sta}=[a_1, \ldots, a_k, b_1, \ldots, b_k, c_1, \ldots, c_k, d_1, \ldots, d_k] \quad (1)$$

$$a_i=\text{mean}_{1\leq t\leq T}f_t(i) \quad (2)$$

$$b_i=\text{std}_{1\leq t\leq T}f_t(i) \quad (3)$$

$$c_i=\min_{1\leq t\leq T}f_t(i) \quad (4)$$

$$d_i=\max_{1\leq t\leq T}f_t(i) \quad (5)$$

In some embodiments, to capture temporal evolution of per-frame descriptors, the HPT model accounts for temporal differences of the form $\Delta F_t=F_{t+\Delta t}-F_t$ for $\Delta t=4$ frames. Similar to Equation 1, the HPT model computes a mean aggregation, a standard deviation aggregation, a minimum aggregation, and a maximum aggregation of $F_t$ and concatenates them into the dynamic video descriptor.

$$F_s^{dyn}=[\Delta a_1, \ldots, \Delta a_k, \Delta b_1, \ldots, \Delta b_k, \Delta c_1, \ldots, \Delta c_k, \Delta d_1, \ldots, \Delta d_k] \quad (6)$$

In some embodiments, video descriptors for motion and appearance for the whole frame and different aggregation schemes are normalized and concatenated into a Scene Feature Vector. Normalization can be performed by dividing video descriptors by the average $L_2$-norm of the $F_t$ from a training set.

In some embodiments, the concatenation of static and dynamic descriptors is denoted by "Static+Dyn." The final dimension of the scene feature vector can be 4×4K×2×2=64K, 4K-dimensional CNN descriptor for appearance and motion (4 type feature operator, with static and dynamic features, with RGB and flow features). Such dimensionality is comparable to the size of Fisher vector used to encode dense trajectory features.

Temporal Features $F_t$

As shown in FIG. 7, key frames may be obtained from the input video, and machine learning algorithms (e.g., inception batch normalization) may be used to obtain deep temporal features from the key frames. In some embodiments, temporal features can be used as HPT base level information. For each video, the HPT model may select N frames and extract global pooling layer features using Inception Batch Normalization RGB and flow Network. Each frame can also generate a 1024-dimension feature.

Inception Batch Normalization RGB and flow Network are deep learning models fine-tuned from VGG layer models. VGG is a convolutional neural network model that achieves 92.7% top-5 test accuracy in ImageNet, which is a dataset of over 14 million images belonging to 1000 classes. The fine tuning process uses data from a UCF 101 dataset. The temporal feature can be written as $F_t$ where $F_t=[\varphi(t_1), \ldots, \varphi(t_N)]$. Here, $\varphi(t)$ represents the feature when selecting the frame from the time t. Both RGB feature and flow feature can be extracted as modality for the temporal feature.

Human Pose Feature $F_p$

As shown in FIG. 7, key poses and interactions may be obtained from the input video, and machine learning algorithms (e.g., CNN) may be used to obtain deep pose features from the key poses and interactions. Conventionally, pose configuration (computing the distance within joint locations and inner angels) is used for activity recognition. However, traditional pose estimation results are typically not accurate enough for classifying the activity. In order to obtain a more accurate estimation result, in some embodiments, pose patches are used instead of pose configurations. Pose patches generate a much longer feature vector by describing the image and flow instead of geometry, and contain more information than directly extracting hand-crafted features from the pose configuration.

In some embodiments, four pose patches are used to obtain the human pose feature, the pose patches including: full body, upper body, left elbow, and right elbow. Both RGB and flow modality can be used. In one example, $\varphi(P, t)$ represents the feature when using pose configuration P at the time point t, each P is a configuration which is a combination for pose patches, and there are four pose patches $p_1, p_2, p_3$, and $p_4$. Thus, $\delta(p, t)$ can represent the deep feature vector where pose patch p is extracted at time point t. The combined pose feature is represented as $\varphi(P, t)=[\delta(p_1, t), \delta(p_2, t), \delta(p_3, t), \delta(p_4, t)]$. Also, $\varphi(P, t)$ can be in both RGB modality or flow modality.

Deformable Feature $F_d$

HPT framework further comprises deformable information, for compensating the cost and picking up the best frames and the best pose patches simultaneously when running the patch detectors in each potential area in the selected frame. A person of ordinary skill in the art may appreciate that the deformable feature may comprise a feature that is not bound to a fixed location in the object's model. The deformable information compensates for the variance in pose and temporal information. $\psi(P, t)$ can represent the penalty feature that uses pose configuration P in the time point t, where $\psi(P, t)=[dx, dx^2, dy, dy^2, dt, dt^2]$. Here, $[x_0, y_0, t_0]$ is the anchor position for patch $p_i$. This is a 6-dimension vector in which $dx=|x-x_0|, dy=|y-y_0|, dt=|t-t_0|$ where x, y is the relative location where the patch is extracted, and t is the time point when the frame is extracted.

HPT Inference

In some embodiments, HPT inference can be used to predict the activity class for a given video and obtain the most discriminative pose patches and the most discriminative temporal information. There can be four terms in the full video feature description, $\tau(V)$ for scene feature, $\varphi(t)$ for temporal feature, $\varphi(P, t)$ for human pose feature, and $\psi(P, t)$ for deformable feature. The whole feature can be written as Equation 7.

$$F(V,A)=[\tau(V),\varphi(t_1), \ldots, \varphi(t_N),\varphi(P_1,t_1), \ldots \varphi(P_N,t_N), \psi(P_1,t_1), \ldots, \psi(P_N,t_N)] \quad (7)$$

To combine various features for making predictions, each feature may be assigned a weight. For weights used in the HPT model, for example, $\omega_s$ is the weight for scene feature, $\omega_t$ is the weight for temporal feature, $\omega_p$ is the weight for pose feature, and $\omega_d$ is the weight for the deformable feature. The whole weight can be written as Equation 8.

$$\omega=[\omega_s,\omega_t,\omega_p,\omega_d] \quad (8)$$

The total score for the video is computed as Equation 9.

$$Score(V,A)=\omega \cdot F(V,A) \quad (9)$$

HPT Learning

For HPT learning, the HPT model uses raw features generated from deep learning models as HPT's building block. VGG model can be used for both the scene layer and pose layer. For RGB modality, the publicly available VGG network from that has been pre-trained on the ImageNet ILSVRC-2012 challenge dataset can be used. For flow patches, the motion network that has been pre-trained for action recognition task on the UCF101 dataset can be used.

For temporal layer, the HPT model uses the Inception with Batch Normalization (BN-Inception) as building block, for its good balance between accuracy and efficiency. The original BN-Inception architecture can be adapted to the design of two-stream Convolutional Neural Networks. As in the original two-stream Convolutional Neural Networks, the spatial stream Convolutional Neural Network operates on a single RGB images, and the temporal stream Convolutional Neural Network takes a s-tack of consecutive optical flow fields as input. As spatial networks take RGB images as input, models trained on the ImageNet as initialization can be used.

In some embodiments, the HPT model uses LIBSVM (a machine learning library) and the deep features from VGG and BN-Inception to obtain the initialization parameter $[\omega_s^0, \omega_t^0, \omega_p^0]$, and then puts this initial parameter into a latent SVM framework.

In some embodiments, the HPT model can be trained using latent SVM framework, in which the pose configurations and temporal locations are latent variables. The weights cot for the temporal feature, $\omega_p$ for the pose feature, and $\omega_d$ for the deformable information can be learned from the latent SVM. Given a training set of N patch configurations in which their corresponding binary class labels $y_i$ belong to $[-1, 1]$, their feature representations can be computed to obtain dataset $(V_i, y_i), \ldots, (V_N, y_N)$. If $\omega=[\omega_s, \omega_t, \omega_p, \omega_d]$, minimization can be performed for:

$$\min_\omega \frac{1}{2}\|\omega\|^2 + C\sum_{i=1}^N \max(0, 1-y_i)$$

$$f\omega(V) = \max_{P,t} \omega \cdot \Phi(V, P, t)$$

Optimization can be achieved using a Dual Coordinate Descent algorithm.

Alternatively, other activity recognition algorithms may also be suitable for conducting the complex analysis described above, and is not limited herein.

As shown, the local device and the Cloud server can be assigned with different tasks according to their own features. The basic analysis conducted in the local device may vary based on the hardware platform used in the local device and the computation ability thereof. In one example, the hardware platform in the local device may be Raspberry Pi™. Accordingly, the local device may be used for conducting simple algorithms such as human detection algorithm and stranger detection algorithm, which aims at detecting and tracking humans presented in the video clip. For example, the local device may implement the human detection algorithm shown in FIG. 4. It may further calculate the number of people presented in the video clip as well as the duration of stay of each person. Based on the analysis of the local device, the Cloud server may continue to conduct a complex activity recognition algorithm for identifying the activity of the human detected by the local device. For example, the Cloud server may conduct the activity recognition algorithm shown in FIG. 5.

In another example, the hardware platform in the local device may comprise NVIDIA Jetson TX1™. Since NVIDIA Jetson TX1™ includes modules for deep learning, computer vision, GPU computing, and graphics, it may perform some of the deep computation in the activity recognition algorithm. Accordingly, in this example, the local device may be used for conducting simple algorithms such as human detection algorithm and stranger detection algorithm, as well as part of the complex activity recognition algorithm. For example, the local device may conduct the human detection algorithm shown in FIG. 4, as well as part of the activity recognition algorithm shown in FIG. 5 for extracting the scene features, temporal features, and pose features from the video clip. Then, the Cloud server may conduct the rest of the activity recognition algorithm shown in FIG. 5 for combining these features and predicting the activity of the human.

The hardware platform used in the local device of the present disclosure is not limited to the hardware platform disclosed above. The algorithms conducted in the local device may vary in different embodiments depending on the computation ability of the hardware platform, and are not limited to the examples described above.

Figure 8:
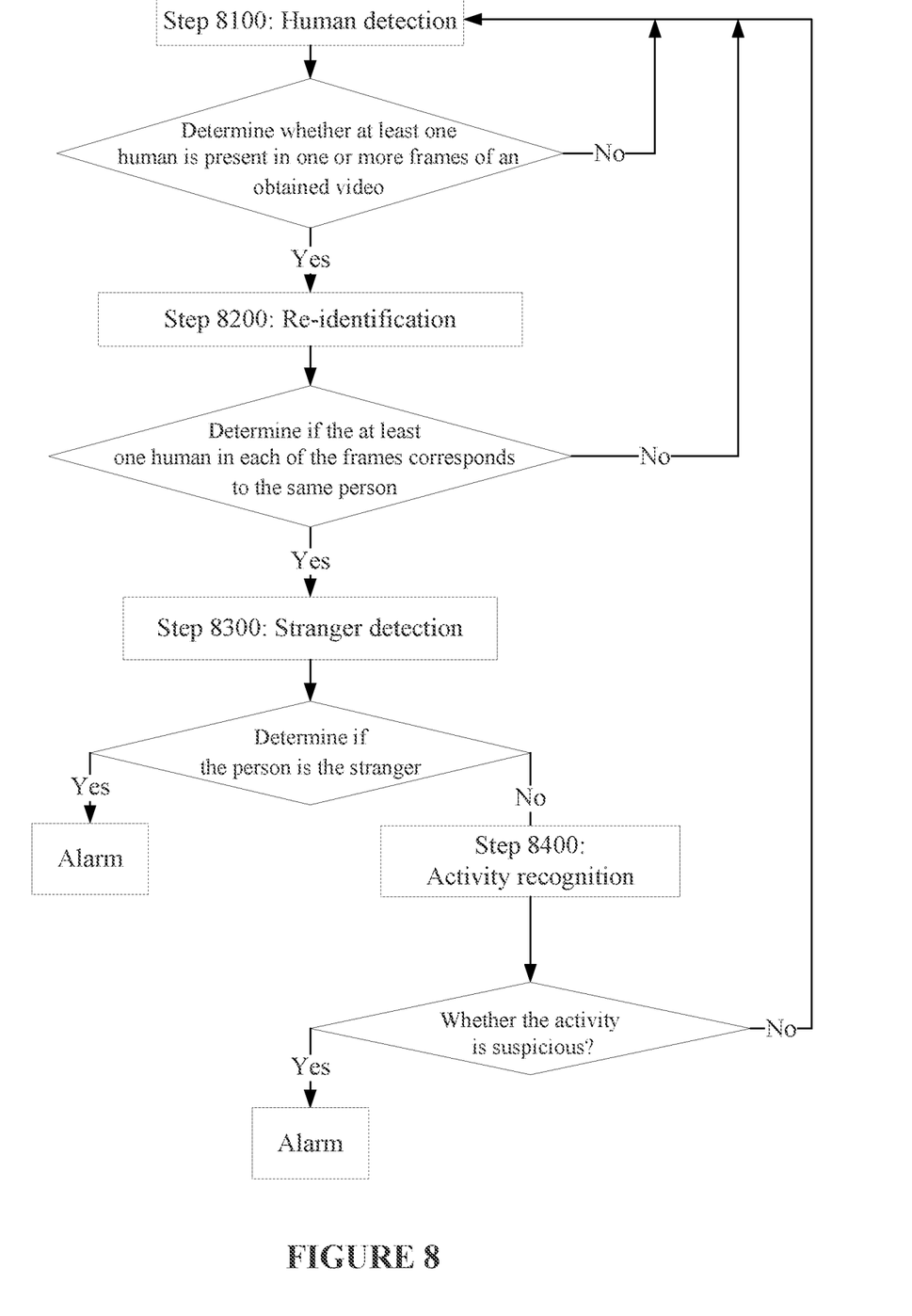
FIG. 8 illustrates an exemplary activity recognition method according to some embodiments of the present disclosure.

FIG. 8 illustrates an exemplary activity recognition method according to some embodiments of the present disclosure. In some embodiments, a non-transitory computer-readable storage medium storing instructions that, when executed by one or more processors, cause the one or more processor to perform the activity recognition method is disclosed. The activity recognition method may comprise: (1) obtaining a video; (2) determining whether at least one human is present in one or more frames of the video; (3) in response to determining the at least one human present in the video, determining if the at least one human in each of the frames corresponds to the same person; (4) in response to determining that the at least one human in each of the frames corresponds to the same person, determining if the person is a stranger; (5) in response to determining that the person is not a stranger, transmitting at least a portion of the video to the server; (6) predicting an activity class associated with the person; and (7) triggering an alarm based on the activity class. The alarm may comprise a notification (e.g., a message) to a user of the activity recognition system, a law enforcement authority, etc.

In some embodiments, the one or more processors comprise at least a first processor associated with a local device (e.g., a processor of a local device), and at least a second processor associated with a server (e.g., a processor of a server). The instructions may cause the local and/or the server to perform various steps of the activity recognition method. For example, the first processor is caused to perform (1)-(5), the second processor is caused to perform (6)-(7), and performing (6) requires more computing power and more costs than performing (1)-(5). The storage medium may be disposed on the local device and/or the server. That is, the local device and the cloud server may each comprise a processor and a non-transitory computer-readable storage medium storing instructions that, when executed by the processor, cause the processor to perform the various steps. Alternatively, the storage medium may be disposed on the local device, on the server, or on another network device accessible to the processor and the server.

In some embodiments, the local device may obtain a video. For example, the local device comprises a camera as described above. To obtain the video, the local device is configured to cause the camera to stream the video in real time.

As shown in FIG. 8, in Step 8100, the local device may determine whether at least one human is present in one or more frames of the video. In some embodiments, to determine whether the at least one human is present in the one or more frames of the video, the local device is configured to: execute a human detection algorithm for each of the frames to determine a percentage of the frames comprising the at least one human; and in response to determining the percentage exceeding a threshold, determine that the at least one human is present in the one or more frames of the video. For example, the local device may execute a human detection algorithm to determine frame by frame whether a human is presented in the video clip. For example, the local device detects whether a human is presented in 75% of the frames within 5 seconds. If a human is presented in 75% or more of the frames within 5 seconds, the local device determines that a human has been detected, and the method proceeds to Step 8200; and if no human is presented in 75% or more of the frames within 5 seconds, the local device continues to monitor for human detection.

In some embodiments, the video captures an environment. To execute the human detection algorithm for the frame, as described above with reference to FIG. 4, the local device is configured to: initialize a background, wherein the background is updated in real time and the update includes at least one of a viewpoint of the camera or an illumination of the environment; and compare an input associated with the frame with the background to perform human detection for the frame.

In Step 8200, the local device is configured to, in response to determining the at least one human present in the video, determine if the at least one human in each of the frames corresponds to the same person. In some embodiments, to determine if the at least one human in each of the frames corresponds to the same person, the local device is configured to: execute a re-identification algorithm to verify one or more features associated with the at least one human across the one or more frames; and determine if the one or more features are consistent. That is, the local device may use a re-identification algorithm to confirm whether the persons correspondingly in various frames detected in Step 8100 (e.g., a person in a frame, a person is the next frame, and so forth) are the same person to prevent false alarming. For example, the local device determines whether the persons in the various frames (e.g., within 5 seconds of frames, or within 5 consecutive frames) are the same person. If the persons detected in the various frames are the same person, the method proceeds to Step 8300; and if the persons detected in the various frames are actually different people, the method goes back to Step 8100 to monitor for human detection.

With respect to the re-identification algorithm, the local device may rely on one or more factors from image analysis to determine the identities of the persons in the consecutive frames are consistent. For example, the local device may verify one or more features associated with the persons are consistent across the frames. Consistent body features (e.g., hair color, height, shoulder width), consistent clothing (e.g., clothing color, clothing type), and consistent movement (e.g., a smooth displacement of a person from one location to another relative to the frame across consecutive frames) are among the factors that can help re-identify the same person cross various frames.

In Step 8300, the local device is configured to, in response to determining that the at least one human in each of the frames corresponds to the same person, determine if the person is a stranger. In some embodiments, to determine if the person is the stranger, the local device is configured to: execute a stranger detection algorithm to determine an identity of the person; and in response to determining the identity not in a white list, determine the person as the stranger. The local device may be further configured to: in response to determining that the person is a stranger, trigger the alarm. That is, the local device may use a stranger detection algorithm to determine whether the person presented in the video clip is a stranger. For example, a face verification algorithm can be used to identify the detected person. If the person is a stranger, the local system can alert the user; and if the person is not a stranger, the method may proceed to Step 8400. Here, a stranger may refer to a person not recognized by the local device or an alternative system. For example, a user may store face portraits of family members and other recognized people along with associated identities in a database (e.g., as a white list), and the detected person's face portrait may be captured and compared with the stored face portraits in the database. If no match is found, the detected person can be recognized as a stranger, and the local device may trigger the alarm.

In Step 8400, in response to determining that the person is not a stranger, the local device may transmit at least a portion of the video to the server. The server may be configured to: predict an activity class associated with the person; and trigger an alarm based on the activity class. That is, the local device may upload or otherwise transmit at least a portion of the video clip to the Cloud server to conduct further pose and activity recognition, for analyzing the person's behavior and determining any suspicious activity. For example, the activity recognition process may be conducted using the method described above with reference to FIG. 5 to predict the activity class of the person. There may be various preset activity classes each associated with a preset indication of whether the associated activity class is sufficiently risky to trigger the alarm. Here, the risk may involve a danger to the user, the person, the user's property, etc. For example, an activity class of reading books may be insufficient to trigger the alarm, while an activity class of breaking a safe or tripping on a floor may be sufficient to trigger the alarm. Thus, for example, if the person is determined to be suspicious (e.g., searching for valuables), the Cloud server and/or the local device may alert the user; and if not, the method goes back to Step 8100 to monitor for human detection.

In some embodiments, as described above with reference to FIGS. 5 to 7, to predict the activity class associated with the person, the server may be configured to: extract statistical scene features from the at least one portion of the video; extract temporal features from the at least one portion of the video; extract pose features from the at least one portion of the video; and combine the statistical scene features, the temporal features, and the pose features to predict the activity class of the person. The pose features may each comprise a plurality of pose patches, the pose patches each associated with full body, upper body, left elbow, and right elbow.

In some embodiments, the server is further configured to: obtain deformable features from the at least one portion of the video; and combine the statistical scene features, the temporal features, the pose features, and the deformable features to predict the activity class of the person.

In some embodiments, basic analysis such as human detection, re-identification, and stranger detection conducted in Steps 8100, 8200, and 8300 are executed in the local device. Therefore, relevant computation may be realized in a cheaper hardware platform in the local device. Moreover, network communication is not required for these analysis, thereby reducing costs on network bandwidth and data flow. This is particularly beneficial for a complete mobile environment, where communication within the local device may need to be done via 4G LTE, which is slow and expensive.

After conducting the basic analysis, if the local device determines that the video clip needs further analysis, the local device may upload a portion of the video to the Cloud server, where more complex hardware platforms and computation tools in the server can be used to compute and analyze human activities. As such, the local device and the Cloud server are complementary to each other, and automatic surveillance can be realized efficiently with lower cost.

The human detection algorithm, the re-identification algorithm, and the stranger detection algorithm used in this example may adopt the same principle as the detection algorithm described above with reference to FIG. 4. Additionally or alternatively, other algorithms may also be adopted.

As described, the disclosed activity recognition system can combine the local device with the Cloud server and assign different tasks to the two devices according to their features. The local device requires lower costs and is able to execute basic analysis. The Cloud server is more expensive and produce more accurate results. Therefore, video clips which need further analysis can be uploaded to the Cloud server, which will accurately recognize human activities and report the result to the user. Therefore, the whole activity recognition process may not rely solely on the local device or the Cloud server. The local device and the Cloud server may synergize to accurately and efficiently recognize human activities while limiting the cost.

Although the above-mentioned system has been described as used for human detection and surveillance, it can be applied to detect other objects, such as automobiles or animals. Further, those skilled in the art may understand and implement other variations of the disclosed embodiments from a study of the drawings, the specification, or the appended claims.

In the claims, the word "comprising" does not exclude other elements or steps, and the indefinite article "a" or "an" does not exclude a plurality. In applications according to present disclosure, one element may perform functions of several technical feature recited in claims. Any reference signs in the claims should not be construed as limiting the scope of the disclosure.

What is claimed is:

1. An activity recognition system, comprising a local device and a server, wherein:
   the local device comprises one or more cameras and a hardware platform, and is configured to:
   obtain a video, wherein the video comprises a plurality of frames and is captured by the one or more cameras;
   conduct, by the hardware platform, a basic human detection on the video to obtain a basic detection result, wherein the basic detection result indicates whether at least one human is present in multiple frames of the video, and wherein to conduct the basic human detection, the hardware platform is configured to:
   build a background model, wherein an input of the background model is a frame of the video, an output of the background model includes a motion probability, and the background model is updated for each frame of the video to reflect a change of a viewpoint of the one or more cameras;
   obtain, for each frame of the video, a difference between the frame and the output of the background model using the frame as the input,
   determine, based on the differences, a detected region in the multiple frames of the video,
   generate, based on the detected region, a predicted candidate region, and
   generate, based on the predicted candidate region, the basic detection result, and wherein the hardware platform is further configured to:
   determine, in response to the basic detection result indicating at least one human present in the multiple frames of the video, whether the at least one human in each of the multiple frames corresponds to the same person, determine, in response to determining that the at least one human in each of the multiple frames corresponds to the same person, whether the person is a stranger that is not in a list of known persons, and transmit, in response to determining that the person is not a stranger, at least one portion of the video to the server, and the server is configured to:
extract statistical scene features from the at least one portion of the video;
extract temporal features from the at least one portion of the video;
extract pose features from the at least one portion of the video; and
predict, in response to the basic detection result indicating at least one person is present in the video and based on the statistical scene features, the temporal features, and the pose features, an activity class associated with the person, wherein the activity class associated with the person is predicted using a Hierarchy Pose Temporal (HPT) model comprising a weight for each of the statistical scene features, the temporal features, and the pose features, wherein the weights are trained using a Dual Coordinate Descent algorithm.

2. The activity recognition system according to claim 1, wherein the pose features comprise a plurality of pose patches, the pose patches each associated with full body, upper body, left elbow, and right elbow, and wherein to extract the pose features, the server is further configured to:
obtain one or more key poses from the at least one portion of the video; and
extract the pose features from the one or more key poses using one or more machine learning algorithms.

3. The activity recognition system according to claim 1, wherein the server is further configured to:
obtain deformable features from the at least one portion of the video; and
predict, based on the statistical scene features, the temporal features, the pose features, and the deformable features, the activity class associated with the person.

4. An activity recognition method, comprising:
obtaining, by a local device comprising one or more cameras and a hardware platform, a video, wherein the video comprises a plurality of frames and is captured by the one or more cameras;
conducting, by the hardware platform, a basic human detection on the video to obtain a basic detection result, wherein the basic detection result indicates whether at least one human is present in multiple frames of the video, and wherein the basic human detection comprises:
building a background model, wherein an input of the background model is a frame of the video, an output of the background model includes a motion probability, and the background model is updated for each frame of the video to reflect a change of a viewpoint of the one or more cameras,
obtaining, for each frame of the video, a difference between the frame and the output of the background model using the frame as the input,
determining, based on the differences, a detected region in the multiple frames of the video,
generating, based on the detected region, a predicted candidate region, and
generating, based on the predicted candidate region, the basic detection result;

determining, by the hardware platform and in response to the basic detection result indicating at least one human present in the multiple frames of the video, whether the at least one human in each of the multiple frames corresponds to the same person;

determining, by the hardware platform and in response to determining that the at least one human in each of the multiple frames corresponds to the same person, whether the person is a stranger that is not in a list of known persons;

transmitting, by the hardware platform and in response to determining that the person is not a stranger, at least one portion of the video to a server;

extracting, by the server, statistical scene features from the at least one portion of the video;

extracting, by the server, temporal features from the at least one portion of the video;

extracting, by the server, pose features from the at least one portion of the video; and predicting, by the server, in response to the basic detection result indicating at least one person is present in the video, and based on the statistical scene features, the temporal features, and the pose features, an activity class associated with the person, wherein the activity class associated with the person is predicted using a Hierarchy Pose Temporal (HPT) model comprising a weight for each of the statistical scene features, the temporal features, and the pose features, wherein the weights are trained using a Dual Coordinate Descent algorithm.

5. The activity recognition method according to claim 4, wherein the pose features comprise a plurality of pose patches, the pose patches each associated with full body, upper body, left elbow, and right elbow, and wherein extracting the pose features comprises:
obtaining one or more key poses from the at least one portion of the video; and
extracting the pose features from the one or more key poses using one or more machine learning algorithms.

6. The activity recognition method according to claim 4, further comprising:
obtaining, by the server, deformable features from the at least one portion of the video, wherein predicting the activity class associated with the person comprises:
predicting, based on the statistical scene features, the temporal features, the pose features, and the deformable features, the activity class associated with the person.

7. A non-transitory computer-readable storage medium storing instructions that, upon being executed by one or more processors, cause the one or more processors to perform an activity recognition method, the method comprising:
obtaining, by a local device comprising one or more cameras and a hardware platform, a video, wherein the video comprises a plurality of frames and is captured by the one or more cameras;
conducting, by the hardware platform, a basic human detection on the video to obtain a basic detection result, wherein the basic detection result indicates whether at least one human is present in multiple frames of the video, and wherein the basic human detection comprises:
building a background model, wherein an input of the background model is a frame of the video, an output of the background model includes a motion probability, and the background model is updated for each frame of the video to reflect a change of a viewpoint of the one or more cameras, obtaining, for each frame of the video, a difference between the frame and the output of the background model using the frame as the input, determining, based on the differences, a detected region in the multiple frames of the video, generating, based on the detected region, a predicted candidate region, and generating, based on the predicted candidate region, the basic detection result;

determining, by the hardware platform and in response to the basic detection result indicating at least one human present in the multiple frames of the video, whether the at least one human in each of the multiple frames corresponds to the same person;

determining, by the hardware platform and in response to determining that the at least one human in each of the multiple frames corresponds to the same person, whether the person is a stranger that is not in a list of known persons;

transmitting, by the hardware platform and in response to determining that the person is not a stranger, at least one portion of the video to a server;

extracting, by the server, statistical scene features from the at least one portion of the video;

extracting, by the server, temporal features from the at least one portion of the video;

extracting, by the server, pose features from the at least one portion of the video; and predicting, by the server, in response to the basic detection result indicating at least one person is present in the video, and based on the statistical scene features, the temporal features, and the pose features, an activity class associated with the person, wherein the activity class associated with the person is predicted using a Hierarchy Pose Temporal (HPT) model comprising a weight for each of the statistical scene features, the temporal features, and the pose features, wherein the weights are trained using a Dual Coordinate Descent algorithm.

8. The activity recognition system of claim 1, wherein the local device is further configured to:

determine whether the basic detection result has reached a threshold accuracy; and upload, in response to the basic detection result not reaching the threshold accuracy, the at one portion of the video to the server, and wherein the server is further configured to:

receive, from the local device, the at least one portion of the video;

conduct a complex detection on the at least one portion of the video to obtain a complex detection result; and trigger, based on the complex detection result, a response.

9. The activity recognition system of claim 1, wherein, to extract the temporal features, the server is further configured to:

obtain one or more key frames from the at least one portion of the video; and extract the temporal features from the one or more key frames using one or more machine learning algorithms.

10. The activity recognition system of claim 1, wherein the server is further configured to:

predict the activity class associated with the person by using a tree structure model, wherein the statistical scene features are used at a coarse level of the tree structure model, the temporal features are used at a base level of the tree structure model, and the pose features are used at a fine level of the tree structure model.

11. The activity recognition system of claim 10, wherein:

each of the statistical scene features includes a static scene feature and a dynamic scene feature, the server is further configured to obtain the static scene feature by applying mathematic operations over a first number of frames of the at least one portion of the video, wherein the mathematic operations include an average operation, a standard deviation operation, a minimum operation, and a maximum operation; and the server is further configured to obtain the dynamic scene feature by computing a temporal difference between two frames of the at least one portion of the video that are a second number of frames apart.

12. The activity recognition method of claim 4, further comprising:

determining, by the local device, whether the basic detection result has reached a threshold accuracy;

uploading, by the local device, in response to the basic detection result not reaching the threshold accuracy, the at least one portion of the video to the server;

receiving, by the server, from the local device, the at least one portion of the video;

conducting, by the server, a complex detection on the at least one portion of the video to obtain a complex detection result; and triggering, by the server, based on the complex detection result, a response.

13. The activity recognition method of claim 4, wherein extracting temporal features from the at least one portion of the video comprises:

obtaining one or more key frames from the at least one portion of the video; and extracting the temporal features from the one or more key frames using one or more machine learning algorithms.

14. The activity recognition method of claim 4, wherein predicting the activity class associated with the person further comprises:

predicting, using a tree structure model, the activity class associated with the person, wherein the statistical scene features are used at a coarse level of the tree structure model, the temporal features are used at a base level of the tree structure model, and the pose features are used at a fine level of the tree structure model.

15. The activity recognition method of claim 14, wherein each of the statistical scene features includes a static scene feature and a dynamic scene feature, and wherein extracting statistical scene features from the at least one portion of the video comprises:

obtaining, by the server, the static scene feature by applying mathematic operations over a first number of frames of the at least one portion of the video, wherein the mathematic operations include an average operation, a standard deviation operation, a minimum operation, and a maximum operation; and obtaining, by the server, the dynamic scene feature by computing a temporal difference between two frames of the at least one portion of the video that are a second number of frames apart.

16. The storage medium of claim 7, wherein the activity recognition method further comprises:

determining whether the basic detection result has reached a threshold accuracy;

conducting, in response to the basic detection result not reaching the threshold accuracy, a complex detection on the at least one portion of the video to obtain a complex detection result; and triggering, based on the complex detection result, a response.

17. The storage medium of claim 7, wherein predicting the activity class associated with the person further comprises:

predicting, using a tree structure model, the activity class associated with the person, wherein the statistical scene features are used at a coarse level of the tree structure model, the temporal features are used at a base level of the tree structure model, and the pose features are used at a fine level of the tree structure model.

* * * * *